(12) United States Patent
Stout et al.

(10) Patent No.: US 6,799,105 B2
(45) Date of Patent: Sep. 28, 2004

(54) VARIABLE STEERING RATIO CONTROL SYSTEM AND METHOD

(75) Inventors: Gregory J. Stout, Ann Arbor, MI (US); Yixin Yao, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 22 days.

(21) Appl. No.: 10/261,912

(22) Filed: Oct. 1, 2002

(65) Prior Publication Data

US 2004/0064229 A1 Apr. 1, 2004

(51) Int. Cl.$^7$ ................................................. G06F 7/00
(52) U.S. Cl. ........................... 701/44; 701/41; 701/43; 180/421; 180/446; 700/50; 706/913
(58) Field of Search ................................. 180/443, 446, 180/410, 415, 405, 401, 421, 422; 700/47–51; 706/902, 913, 1, 2–9, 15, 45–48, 52, 900, 905; 701/41, 43, 44; 318/567, 568.1, 587

(56) References Cited

U.S. PATENT DOCUMENTS

| | | | | |
|---|---|---|---|---|
| 4,930,084 A | | 5/1990 | Hosaka et al. ................. 701/41 |
| 5,101,351 A | * | 3/1992 | Hattori ......................... 701/27 |
| 5,180,214 A | | 1/1993 | Yeh et al. ..................... 303/111 |
| 5,218,542 A | * | 6/1993 | Endo et al. ................... 701/27 |
| 5,519,614 A | | 5/1996 | Miichi et al. ................. 701/44 |
| 5,545,960 A | * | 8/1996 | Ishikawa ...................... 318/587 |
| 5,561,603 A | * | 10/1996 | Goto ............................ 701/41 |
| 5,634,698 A | * | 6/1997 | Cao et al. ..................... 303/146 |
| 6,370,460 B1 | | 4/2002 | Kaufmann et al. ............ 701/41 |
| 6,442,463 B1 | * | 8/2002 | Qiu et al. ...................... 701/44 |
| 6,487,501 B1 | * | 11/2002 | Jeon ............................. 701/301 |
| 2002/0105428 A1 | * | 8/2002 | Benson et al. ............... 340/635 |
| 2002/0106108 A1 | * | 8/2002 | Benson et al. ............... 382/104 |

FOREIGN PATENT DOCUMENTS

| | | | | |
|---|---|---|---|---|
| EP | 638742 A1 | * | 2/1995 | ............. F16H/61/02 |
| FR | 2787081 A1 | * | 6/2000 | ............. B62D/06/04 |

* cited by examiner

*Primary Examiner*—Jacques H. Louis-Jacques
(74) *Attorney, Agent, or Firm*—Brinks Hofer Gilson & Lione

(57) ABSTRACT

The present invention involves a system and method of controlling a variable steering ratio of a vehicle steer-by-wire system. The variable steering ratio control varies the steering ratio continuously according to steering angle and vehicle speed. The method comprises sensing an actual steering wheel angle and an actual speed of the vehicle and converting the actual steering wheel angle and vehicle speed into values in fuzzy sets based on a steering wheel angle and vehicle speed membership functions with linguistic term labels. The method further includes determining a corresponding degree of membership of the steering wheel angle and vehicle speed. The method further includes inferring a fuzzy road wheel reference angle output value by determining the degree of membership function for the road wheel reference angle using fuzzy rules based on the degrees of steering angle and the vehicle speed. The method further includes converting a fuzzy road wheel angle into an actual road wheel angle. The variable steering ratio can be adjusted according to the vehicle operator's desire with a progressive ratio setup.

41 Claims, 4 Drawing Sheets

VARIABLE STEERING RATIO CONTROL SYSTEM AND METHOD

BACKGROUND OF THE INVENTION

The present invention relates to a system and method of controlling a variable steering ratio of a vehicle steer-by-wire system by applying fuzzy logic technology.

The vehicle steering ratio is one of the critical specifications for a vehicle steering system. Typically, the steering ratio of a vehicle represents a proportional factor between a steering wheel angle and a road wheel angle. For example, if a vehicle steering ratio is 16, the road wheel angle will turn 1 degree when the steering wheel is turned 16 degrees. Most existing vehicles with a conventional steering system have a fixed steering ratio, wherein that the steering ratio remains substantially constant except for minor variations due to the suspension geometry of the vehicle.

In order to improve the steering performance and to reduce the skill level requirement of a vehicle driver, some automotive manufacturers have implemented a variable ratio rack and pinion gear steering system. With a variable ratio steering gear set, the range and adjustment of the variable ratio are limited by the mechanical structure of the gears. This type of gear set only provides a variable ratio as a function of steering wheel angle. Specific manufacturing technologies are needed to produce a variable ratio rack and pinion gear increasing the product cost and investment requirements.

In a steering system that does not rely on a mechanical connection between the steering wheel and the road wheels, it is possible to vary the steering ratio with the steering wheel angle, the vehicle speed and other vehicle variables that can improve the steering performance using the variable steering ratio. The steer-by-wire system can generate a variable steering ratio. The variable ratio feature can be implemented using software in a steer-by-wire system, such that the product cost, development time and investment are significantly reduced compared to conventional steering system solutions.

It has been known that desired vehicle steering performance results from higher steering ratios on center for improved stability and lower ratios off center, reducing required lock-to-lock turns for easier parking. Furthermore, it is desirable to reduce the sensitivity of the steering ratio with the increase of vehicle speed. It is also possible for the steering system to provide adjustable variable steering ratios in the same vehicle, which could be set by the vehicle driver or automatically based on driving behavior trends. Therefore, it is a challenge for steer-by-wire systems to provide a flexible application environment to implement the variable steering ratio control and achieve the variable ratio steering functions mentioned above.

BRIEF SUMMARY OF THE INVENTION

The present invention generally provides a system and method of controlling a variable steering ratio of a vehicle steer-by-wire system by applying fuzzy logic technology. The vehicle steer-by-wire system can be considered as an integrated control system which is comprised of two different parts according to their functions: a steering wheel control system and a road wheel control system. The steering wheel control system provides the steering feel for the vehicle driver and the steering wheel angle command signal. The road wheel control system provides the actual road wheel angle tracking to the road wheel reference angle signal. The steer-by-wire system further includes a variable steering ratio regulation unit to receive a steering wheel angle signal from the steering wheel system and a vehicle speed signal from the vehicle. The variable steering ratio regulation unit generates the road wheel reference angle to the road wheel system. The variable steering ratio regulation unit provides a different road wheel reference angle based on changes in steering wheel angle and vehicle speed by using fuzzy logic control technology. As a result, the vehicle's steering and handling performance is improved through a broad range of driving conditions.

In one embodiment, the variable steering ratio regulation unit is in electrical communication with both the steering wheel control system and the road wheel control system. The steering wheel control system and the road wheel control system are in electrical communication with each other, wherein the variable steering ratio regulation unit is electrically linked therebetween. This allows the steering ratio regulation unit to receive a steering wheel angle signal from the steering wheel system and signals from vehicle, and generate a steering directional road wheel reference angle to the road wheel system. This also allows the steering wheel system to control the steering wheel reaction torque to produce a realistic steering feel to a driver of the vehicle. This further allows the road wheel system to track a road wheel reference angle based on the steering wheel input from the driver and to maintain alignment between the steering wheel and the road wheels of the vehicle.

The variable steering ratio regulation unit applies fuzzy logic technology to implement the variable steering ratio control, and it further provides a variable steering ratio selection using fuzzy logic inference. The fuzzy logic technology may incorporate imprecise multiple input information including the steering wheel angle and vehicle speed to obtain an optimal smooth solution for variable steering ratio. This invention describes the fuzzy logic based steering ratio control method implemented in the variable steering ratio regulation unit. The fuzzy logic based steering ratio control operates in three steps: fuzzification, inference and defuzzification. All crisp input and output variables including steering wheel angle, vehicle speed and road wheel reference angle are converted into values in the fuzzy sets by defining labels and membership functions. Then, using labels and membership functions as defined in the stage of fuzzification, a set of rules for the fuzzy inference stage are given to describe an optimal road wheel reference angle output based on system requirements and development experience. The road wheel reference angle in a linguistic value description is finally converted to a crisp value in the stage of defuzzification.

The present invention also describes a new development of variable steering ratio control with an adjustable variable steering ratio function. The steering ratio will not only vary with the steering wheel angle and vehicle speed, but it will also vary according to the type of driving and environmental situation. The adjustable variable ratio function could be set by the vehicle operator or it could be set automatically based on the type of driving and environmental situations. The vehicle variables that cause the steering ratio adjustment can be detected using sensors and estimated using other variables.

Further aspects, features, and advantages of the invention will become apparent from consideration from the following description and the appended claims when taken in connection with the accompanying drawings.

DETAILED DESCRIPTION OF THE INVENTION

Figure 1:
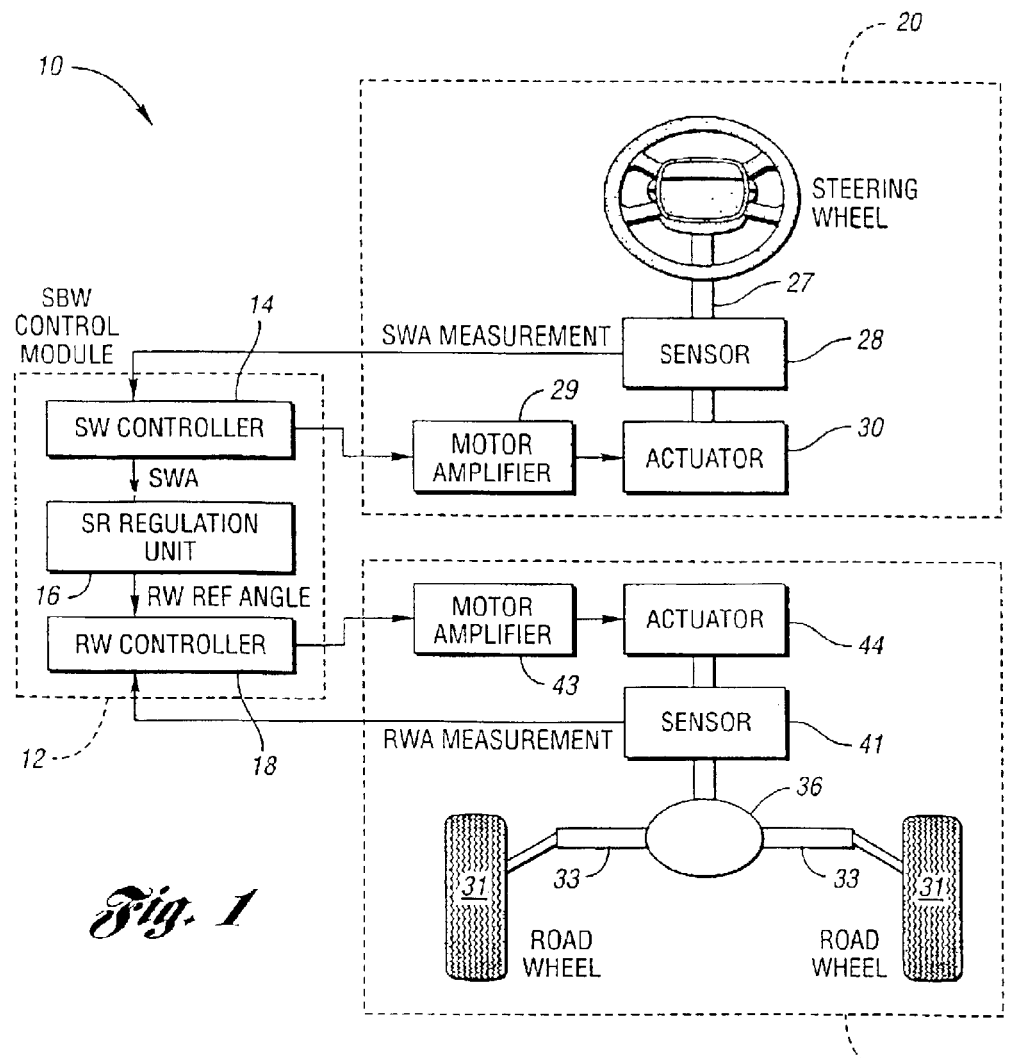
FIG. 1 is a schematic diagram of a vehicle steer-by-wire system in accordance with the present invention.

FIG. 1 illustrates a schematic diagram of a vehicle steer-by-wire system 10 having a steer-by-wire control unit 12. As shown in FIG. 1, steer-by-wire control unit 12 is in electrical communication with steering wheel unit 20 and road wheel assembly unit 23. As shown, control unit 12 includes a steering wheel controller 14, a variable steering ratio regulation unit 16, and a road wheel controller 18. In this embodiment, steering wheel controller 14 is in electrical communication with road wheel controller 18 by way of variable steering ratio regulation unit 16. The steer-by-wire control unit 12 implements steering functions by controlling steering wheel unit 20 and road wheel unit 23. It is implemented generally by utilizing microprocessors. One or a plurality of microprocessors may be used without falling beyond the scope or spirit of the present invention.

As shown in FIG. 1, steer-by-wire system 10 includes steering wheel unit 20 having steering wheel 26 mounted to steering shaft 27. Steering wheel unit 20 further includes steering wheel sensor 28 mounted to steering shaft 27 or actuator 30 for sensing a steering wheel angle and other variables, e.g., an angular velocity of the steering wheel. Steering wheel angle is an angle relative to a center position from which the steering wheel is rotated. The steering wheel sensor 28 is may be in electrical communication with steering wheel controller 14 which may receive signals indicative of steering wheel angle or angular velocity of the steering wheel.

Steering wheel unit 20 may further include a steering wheel motor amplifier 29 which is in electrical communication with steering wheel controller 14. Steering wheel unit 20 may further include a steering wheel motor actuator 30 which is in electrical communication with the motor amplifier 29 and is attached to steering shaft 27. The steering wheel motor actuator receives a motor torque control signal from the amplifier and generates torque on the steering wheel 26 such that the steering wheel unit 20 produces steering feel for the vehicle's driver.

As shown in FIG. 1, road wheel unit 23 includes road wheels 31 each connected to a tie rod 33. Each tie rod 33 is attached to gear assembly 36. Road wheel unit 23 further includes road wheel sensor 41 mounted to motor actuator 44 for sensing a road wheel angle. This may include one or a plurality of road wheel sensors. Alternatively, sensor 41 may be mounted to a road wheel tie rod to sense the displacement such that the road wheel angle is obtained. In this embodiment, the sensor 41 is in electrical communication with road wheel controller 18 for sending signals indicative of road wheel angles. Road wheel unit 23 may also include a motor amplifier 43 for receiving torque control signals from road wheel controller 18. Road wheel unit 23 further includes a motor actuator 44 in electrical communication with the motor amplifier 43. The motor actuator 44 receives motor torque control signal from the amplifier 43 to apply torque on the road wheels 31.

In this embodiment, the road wheel unit 23 includes at least one sensor, amplifier, and actuator for each wheel or both wheels. Of course any number of sensors, amplifiers, or actuators may be used for each wheel without falling beyond the scope or spirit of the present invention.

Figure 2:
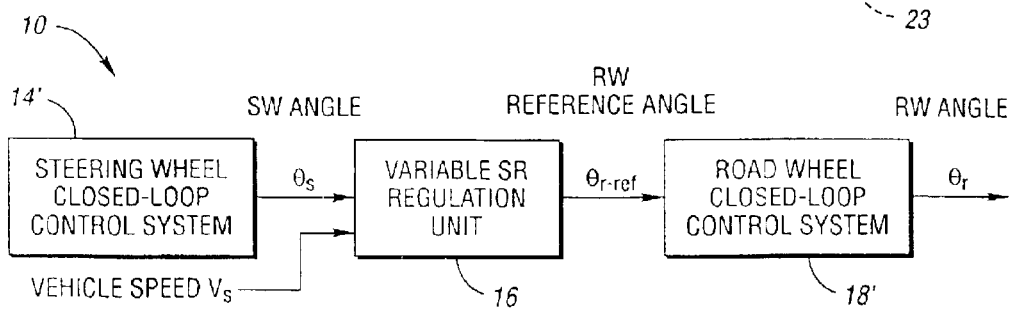
FIG. 2 is a general schematic block diagram of the steer-by-wire system of FIG. 1 in which a variable steering ratio regulation unit is depicted in accordance with the present invention.

As shown in FIG. 1, the steer-by-wire control unit 12 further includes a variable steering ratio regulation unit 16 in accordance with the present invention. The variable steering ratio unit 16 is in electrical communication with steering wheel controller 14 and road wheel controller 18. In order to illustrate the variable steering ratio unit 16, FIG. 2 shows a simplified schematic block diagram for the steer-by-wire system of FIG. 1. There are three blocks in the steer-by-wire system shown in FIG. 2 to represent the steering wheel closed-loop control system 14' including the steering wheel unit 20 and its controller 14, road wheel closed-loop control system 18' including road wheel unit 23 and its controller 18, and variable steering ratio regulation unit 16.

As shown in FIG. 2, variable steering ratio regulation unit 16 receives a steering wheel angle signal $\theta_s$ and a vehicle speed signal $V_s$ from steering wheel control system 14' and the vehicle. Variable steering ratio regulation unit 16 converts steering wheel angle under a scheduling influence of the vehicle speed signal to determine a road wheel reference angle signal $\theta_{r\text{-}ref}$ which is an input reference signal for the road wheel control system 18'. The road wheel control system is designed to have the actual output road wheel angle $\theta_r$ track the reference angle $\theta_{r\text{-}ref}$. Thus, variable steering ratio regulation unit 16 generates variable steering ratio $\gamma = \theta_s/\theta_{r\text{-}ref}$ between steering wheel angle $\theta_s$ and road wheels reference angle $\theta_{r\text{-}ref}$.

Some strategies can be used to implement the variable steering ratio, such as mathematical equations or look-up table. For example, a vehicle steering ratio $\gamma = \theta_s/\theta_{r\text{-}ref}$ may be 16 when the vehicle speed is 20 miles per hour, and the steering ratio could become 20 automatically as the vehicle speed increases to 70 miles per hour. The road wheel angle would turn 1 degree when the steering wheel is turned to 16 degrees in the low speed situation whereas 20 degrees of steering wheel angle rotation would be required to achieve 1 degree of road wheel angle in the high speed situation.

Fuzzy logic technology is applied to infer a steering ratio selection in the variable steering ratio regulation unit in this invention. In other words, the fuzzy logic based variable steering ratio regulation unit determines the desired or optional steering ratio. In this embodiment, the regulation unit 16 applies the fuzzy logic inference including a set of fuzzy logic rules to determine a road wheel reference angle from a steering wheel angle and a vehicle speed.

Figure 3:
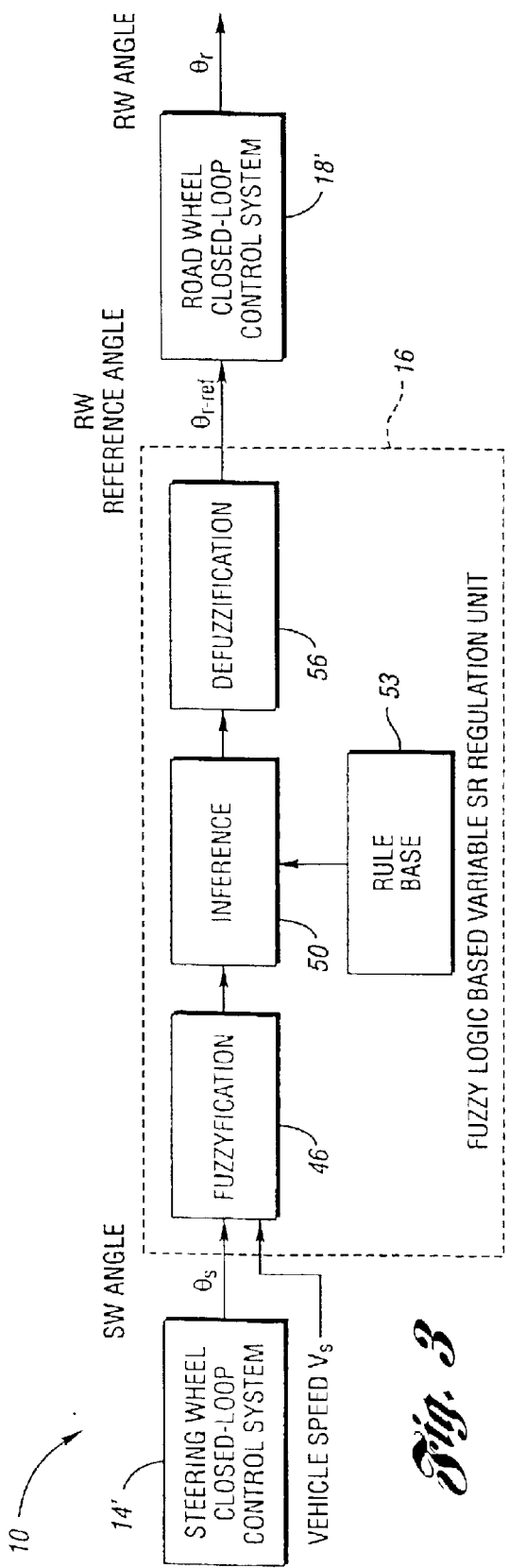
FIG. 3 is a block diagram of the variable steering ratio regulation unit in the steer-by-wire system of FIG. 2.

FIG. 3 illustrates a block diagram of the variable steering ratio regulation unit applying fuzzy logic technology in the steer-by-wire system of FIG. 2. The fuzzy logic based applications generally consists of three elements:

fuzzification, inference and defuzzification. As shown in FIG. 2, the variable steering ratio regulation unit 16 includes a fuzzification block 46, an inference block 50 based on fuzzy logic rules block 53, and a defuzzification block 56.

As the first step to apply the fuzzy logic, the fuzzification 46 converts the exact crisp input steering wheel angle $\theta_s$ and vehicle speed $v_s$ values into values in the fuzzy sets. In the process of fuzzification, a crisp value of a numerical input variable is labeled with a linguistic term, and the corresponding degree of membership for the input variable is determined. Thus, labels and membership functions for input variables including the steering wheel angle and vehicle speed will be defined first. The label and membership function for the output road wheel reference angle variable is also described at the same time.

Figure 4:
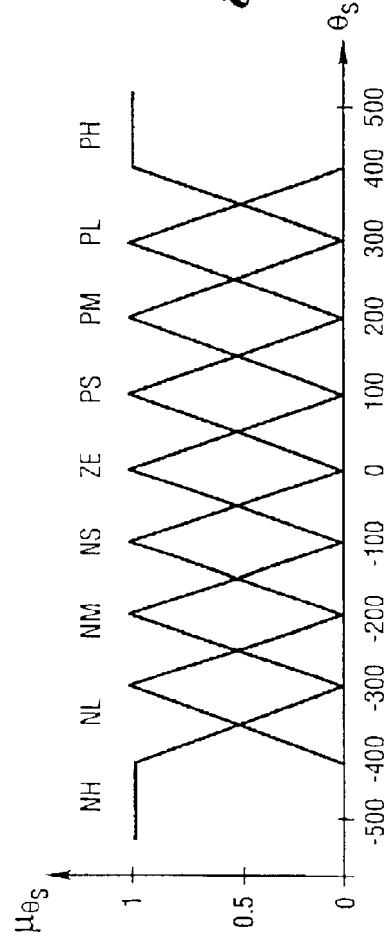
FIG. 4 is a graphical description of a steering angle membership function with labels in accordance with the present invention.
Figure 5:
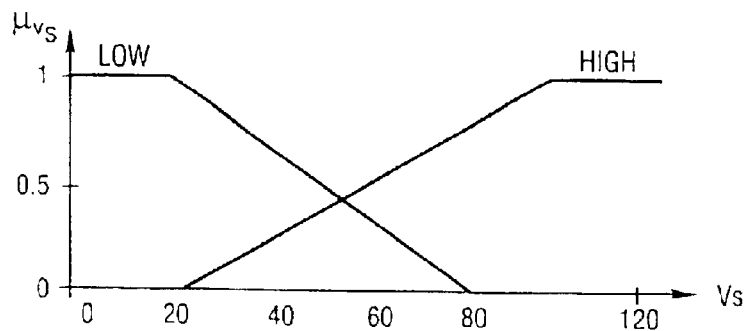
FIG. 5 is a graphical description of a vehicle speed membership function with labels in accordance with the present invention.
Figure 6:
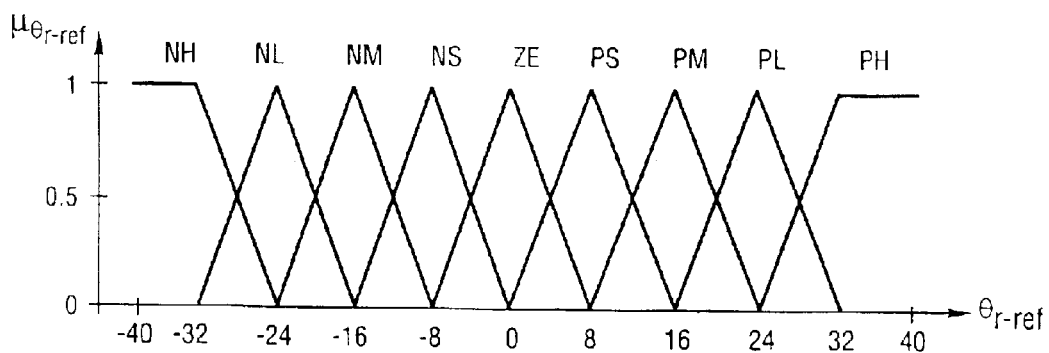
FIG. 6 is a graphical description of a road wheel reference angle membership function with labels in accordance with the present invention.

A membership function is a data curve that defines how each point in the input crisp values is mapped relative to a membership value (degree of membership) between 0 and 1. In this embodiment, a degree of membership is a real number between 0 and 1 such that a transition from membership to non-membership is gradual rather than abrupt. The degree of membership for all its members thus describes a fuzzy set. The higher the number between 0 and 1, the higher the membership. In this embodiment, a label to a crisp value of a numerical input or output variable is a linguistic term within a membership function which is used to identify each membership. Elements of a membership function are taken from a universe of discourse which is the total possible range for each variable. FIGS. 4–6 depict membership functions for input steering wheel angle $\theta_s$ and vehicle speed $v_s$ as well as output road wheel reference angle $\theta_{r\text{-}ref}$ with triangular shapes. However, it is to be noted that the membership function may have other shapes including, but not limited to, trapezoidal, bell curve, and rectangular step shape.

In this embodiment, in order to fuzzify a crisp value of the input variable to a degree of membership with a label in the fuzzy set, corresponding labels and membership functions are determined first. Thus, as shown in FIG. 4, a vehicle steering wheel angle membership function has been plotted depicting a plurality of steering angle labels. As shown, nine triangular shaped curves are defined to cover the required range of an input value (universe of discourse). In this example, steering wheel angle is labeled with linguistic terms using two-letter abbreviations. Here, N represents negative, P represents positive, ZE represents approximately zero, S represents small, M represents medium, L represents large, and H represents very large. Thus, labels for the steering wheel angle in the membership function shown in FIG. 4 are provided. As an example, the labels for the steering wheel angle in the membership function and the ranges of steering wheel angles are provided as follows:

| NH: | negative very large | <−300 deg |
|---|---|---|
| NL: | negative large | −400 to −200 deg |
| NM: | negative medium | −300 to −100 deg |
| NS: | negative small | −200 to 0 deg |
| ZE: | approximately zero | −100 to +100 deg |
| PS: | positive small | 0 to +200 deg |
| PM: | positive medium | +100 to +300 deg |
| PL: | positive large | +200 to +400 deg |
| PH: | positive very large | >+300 deg. |

The vehicle speed membership function with relative labels for each member is given in FIG. 4. Low is used to express the low speed and High is used to express high speed. The labels for the vehicle speed in the membership function and the range of vehicle speed is given as follows:

| Low: low vehicle speed | <60 mph |
|---|---|
| High: high vehicle speed | >20 mph. |

As the output variable, the road wheel reference angle membership function with relative label for each member is given in FIG. 6. The shapes of membership and labels are triangular as with that of the steering wheel angle. The labels for the road wheel reference angle in the membership function and the range of road wheel reference angle are provided as follows:

| NH: | <−24 deg |
|---|---|
| NL: | −32 to −16 deg |
| NM: | −24 to −8 deg |
| NS: | −16 to 0 deg |
| ZE: | −8 to +8 deg |
| PS: | 0 to +16 deg |
| PM: | +8 to +24 deg |
| PL: | +16 to +32 deg |
| PH: | >+24 deg. |

As shown in FIGS. 4 and 5, in the fuzzification block 46, a degree of membership between 0 and 1 is determined for each crisp input value within a corresponding membership with relative label. Each crisp input value falls into at least two memberships expressed by relative labels. For example, a crisp steering wheel angle of −250° falls within the NL having a degree of membership of 0.5 and the NM having a degree of membership of 0.5. Thus, the crisp value of −250° for the steering wheel angle is converted to 0.5 in the membership expressed with NL and 0.5 in the membership expressed with NM. Thus, the steering wheel angle of −250° belongs to the "negative large" membership at a 50 percent level and belongs to the "negative medium" membership at a 50 percent level. A crisp vehicle speed of 40 miles per hour falls within Low having a degree of membership of 0.25 and High having a degree of membership of 0.75 as shown in FIG. 5.

Based on the result of fuzzification 46, the inference 50 infers the fuzzy output variable value by determining the degree of the membership function for the road wheel reference angle. The inference process is implemented by using a set of rules 53. Using input and output variable membership functions as defined above, rules for the fuzzy inference 50 are written that embody a knowledge base required for decision making. The rules may use several variables both in the condition and the conclusion of the rules. The rules are represented in English as if-then statements. For example: IF Steering Wheel Angle is Positive Small (PS) and Vehicle Speed is Low THEN Road Wheel reference Angle is Positive Small (PS).

The rules are defined to cover the different situations encountered in the variable steering ratio from the steering wheel angle to road wheel reference angle. The totality of such rules constitutes a fuzzy inference unit 50 for the determination of the road wheel reference angle. The nine rules are constructed corresponding to the possible combinations of the steering wheel angle and the vehicle speed. A shorthand method of presenting these nine rules is in Table 4. These rules are usually derived by system requirements and development experience to achieve a desired optimum steering ratio choice.

In the process of inference using the inference block 50, the entire set of rules is evaluated, and during this process some rules may "fire up" which means that they become active. For example, particular rules are applicable as follows:

Fuzzy Logic Rules which are fired up when the steering wheel angle is −250° and vehicle speed is 40 mph:

1. If (SW Angle is NL) and (Vehicle Speed is Low) then (RW Reference Angle is NL);
2. If (SW Angle is NM) and (Vehicle Speed is Low) then (RW Reference Angle is NM);
3. If (SW Angle is NL) and (Vehicle Speed is High) then (RW Reference Angle is NM); and
4. If (SW Angle is NM) and (VehicleSpeed is High) then (RW Reference Angle is NS).

The degree of membership function for the output road wheel angle is determined according to the degrees of membership functions for inputs, steering wheel angle and vehicle speed. Since an "AND" operation is used for every rule the minimum criterion of the inputs is used. Therefore, the smaller degree of memberships for inputs steering wheel angle and vehicle speed is chosen to be the degree of membership for the output road wheel reference angle. For example, with a crisp steering angle of −250° and vehicle speed of 40 mph mentioned above, a degree of membership of the road wheel reference angle may be determined by using the minimum criterion. In this embodiment, the degree of membership of the output variable are determined as follows:

| SW Angle | 0.50 NM | 0.50 NM | 0.50 NL | 0.50 NL |
|---|---|---|---|---|
| Vehicle Speed | 0.25 low | 0.75 high | 0.25 low | 0.75 high |
| RW Ref Angle | 0.25 NM | 0.5 NS | 0.25 NL | 0.5 NM |

The above four output results will be overlapped and then processed in the defuzzification 56.

In a defuzzification block 56, the fuzzy value must be converted to a crisp road wheel reference angle. Defuzzification is a process that converts a fuzzy value into a crisp value. This may be accomplished by any suitable method including but not limited to a mean of maximum method, a maximizing decision method, and a Centroidal defuzzification (center of gravity) method.

In this embodiment, the Centroidal defuzzification method is used and may be provided as follows:

$$\theta_r = \frac{\sum_i \mu(x_i) x_i}{\sum_i \mu(x_i)},$$

Here, the crisp output road wheel angle $\theta_r$ is determined by means of center of gravity of the area under the membership function curve of the fuzzy output. Moreover, $\mu(x_i)$ is a degree of membership of $x_i$. Thus, using the center of gravity method, a crisp value of the road wheel reference angle may be determined.

Figure 7:
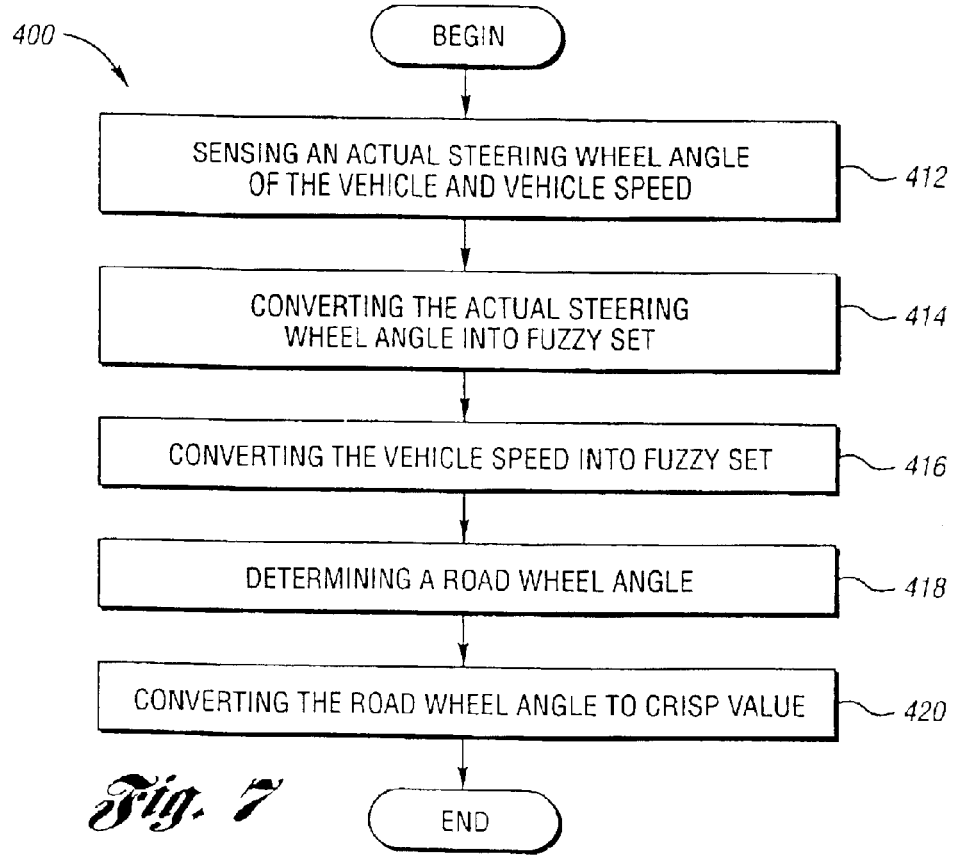
FIG. 7 is a flow chart of a variable steering ratio control of a vehicle having a steer-by-wire system using fuzzy logic technology in accordance with the present invention.

FIG. 7 depicts one flowchart of fuzzy logic based method 400 of controlling variable steering ratio of a vehicle steer-by-wire system. Method 400 includes sensing an actual steering wheel angle and an actual vehicle speed of the vehicle in box 412, converting the actual steering wheel angle into values in the fuzzy sets of the steering wheel angle based on a steering wheel membership function with linguistic term labels and determining the corresponding degree of membership of the steering wheel angle in box 414. Method 400 further includes converting the actual vehicle speed to a vehicle speed in the fuzzy sets of the vehicle speed based on a vehicle speed membership function with linguistic term labels and determining the corresponding degree of membership of the vehicle speed in box 416. Method 400 further includes inferring the fuzzy road wheel reference angel output value by determining the degree of the membership function for the road wheel reference angle using fuzzy rules based on the degrees of steering angle and the vehicle speed in box 418 and converting the fuzzy road wheel angle into an actual road wheel angle in box 420.

It is to be noted that the inputs to the fuzzy logic based variable steering ratio regulation unit in FIG. 2 could include other additional variables to determine a more accurate steering ratio. In this embodiment, new variables and rules may be added to the fuzzy logic inference unit. To accomplish this, a system designer could simply include additional variables and rules to take into account factors that would improve the behavior of the steering ratio control system.

Figure 8:
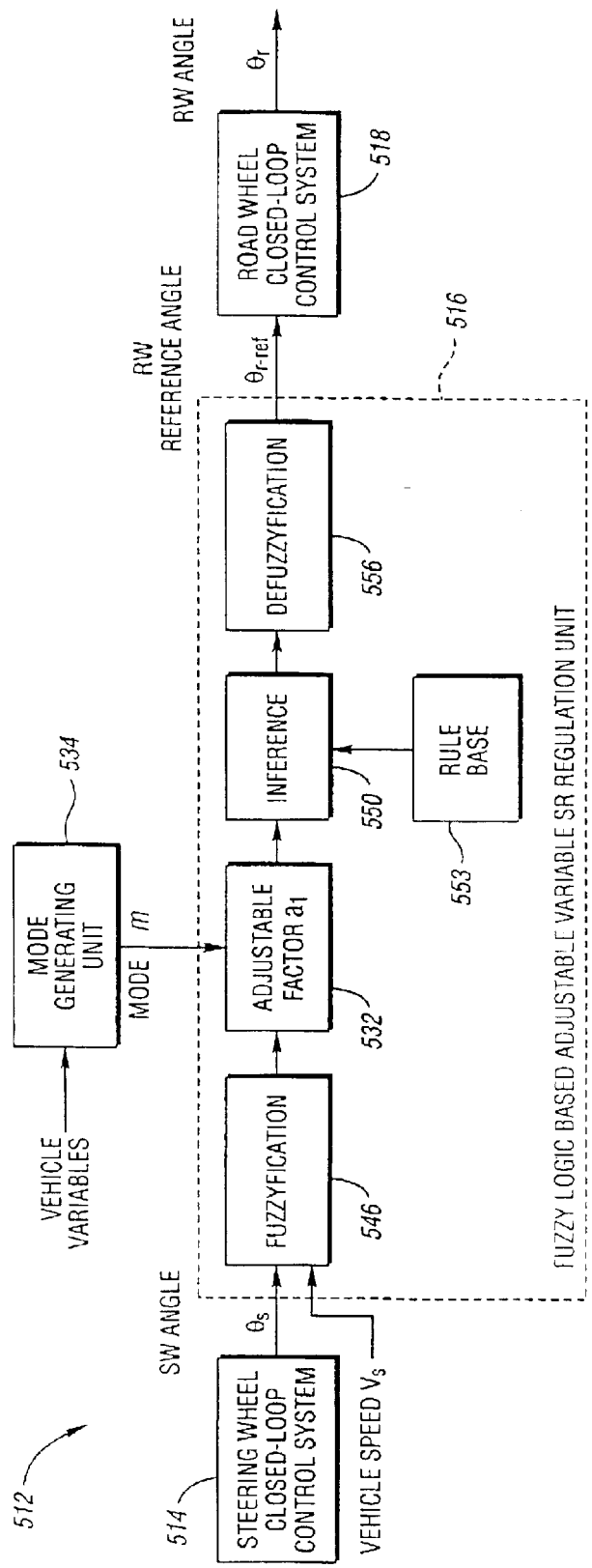
FIG. 8 is a block diagram of one embodiment of a variable steering ratio regulation unit with adjustable variable steering ratio function in accordance with the present invention.

FIG. 8 depicts one embodiment of the variable steering ratio regulation unit in the steer-by-wire system shown of FIG. 1. An adjustable variable steering ratio regulation unit 516 in a steer-by-wire system 512 provides a variable steering ratio with adaptive capability for driving types and environmental situations. In this embodiment, the adjustable variable steering ratio regulation unit 516 includes an adjustable factor unit 532 having an adjustable factor a which changes in the range of 0–1. This adjustable factor a is also called the weighting coefficient in the fuzzy logic technology. The adjustable factor a may be adjusted based on a driving mode. The adjustable factor unit 532 receives a mode signal m from a mode generating unit 534 for adjusting the adjustable factor a to proportionally affect a change in the membership functions. As a result, the output of the fuzzy logic based variable steering ratio regulation unit 516 will be adjusted to achieve the objective of adjustable steering ratio. In an implementation of this adjustable factor fuzzy logic technology, the multiple-adjustable factor $\alpha_1$ (which is related with the steering wheel angle) and $\alpha_2$ (which is related with the vehicle speed) could be used.

As shown in FIG. 8, a variable mode m, is the output of the mode generating unit. The mode generating unit can be designed by using fuzzy logic technology to generate m. The mode signal m may be indicative of a driving mode based on a driving style and an environmental situation.

The driving style may be any suitable driving style including luxury, sport, off-track, inclined, city, highway, and mountainous terrain. Of course, any other suitable driving style may be incorporated therein without falling beyond the scope or spirit of the present invention. The environmental situation may be any suitable environmental situation including dry, wet, icy, and high wind. Of course, any other suitable environmental situation may be incorporated therein without falling beyond the scope or spirit of the present invention.

Based on this strategy, the adjustable variable ratio could be set by the vehicle driver or be set automatically. In the case of setting by the vehicle operator manually, the variable mode m would be switched to a fixed constant unit such that the adjustable factor a does not vary in value. Thus, in this scenario the variable steering ratio fuzzy logic inference unit will only be affected by the fixed constant setting. In the case of setting the mode automatically, the mode m will vary with the driving type and the environmental situation. Thus, the driving type and the environmental situation selected by the driver or automatic setting may be incorporated within the steer-by-wire system in accordance with the present invention.

While the present invention has been described in terms of preferred embodiments, it will be understood, of course, that the invention is not limited thereto since modifications may be made to those skilled in the art, particularly in light of the foregoing teachings.

What is claimed is:

1. A method of controlling a variable steering ratio of a vehicle steer-by-wire system of a vehicle, the method comprising:

sensing an actual steering wheel angle of the vehicle;
    converting the actual steering wheel angle into values in fuzzy sets of the actual steering wheel angle based on a steering wheel angle membership function with linguistic term labels;
    determining a corresponding degree of membership of the actual steering wheel angle;
    inferring a fuzzy road wheel reference angle output value by determining a degree of membership for the fuzzy road wheel reference angle using fuzzy rules based on the degree of membership of the actual steering wheel angle;
    converting the road wheel angle in the fuzzy sets to a crisp road wheel angle of the vehicle; and
    applying a steering ratio of the vehicle based on the crisp steering wheel angle and crisp road wheel reference angle.

2. The method of claim 1 further comprising:
    sensing an actual vehicle speed of the vehicle; and
    converting the actual vehicle speed to a vehicle speed into values in the fuzzy sets of the actual vehicle speed with linguistic term labels and the corresponding degree of membership.

3. The method of claim 2 wherein inferring the road wheel reference angle by determining the degree of membership function for the road wheel reference angel using fuzzy rules is based on degrees of steering wheel angle and vehicle speed.

4. The method of claim 3 wherein the vehicle speed membership function includes a plurality of membership with linguistic term labels.

5. The method of claim 4 wherein the vehicle speed includes speeds ranging from 0 to 60 mph, and 20 to 120 mph.

6. The method of claim 3 wherein the vehicle speed includes speeds ranging between about 0 to 120 mph.

7. The method of claim 3 wherein the step of converting the actual vehicle speed includes determining a degree of membership within at least two memberships expressed by relative labels.

8. The method of claim 7 wherein the degree of membership within the vehicle speed indicates a value between 0 and 1 within a corresponding vehicle speed membership with relative label.

9. The method of claim 3 wherein the step of inferring the road wheel reference angle includes determined the degree of membership function for the road wheel reference angle within at least two memberships expressed by relative labels using predetermined fuzzy rules based on the degrees of steering angle and the vehicle speed.

10. The method of claim 2 wherein the steering ratio of the vehicle is an adjustable variable steering ratio of the steer-by-wire system for a vehicle using fuzzy logic technology.

11. The method of claim 10 further comprising:
    providing an adjustable factor being configured to vary between a range of about 0 and 1 and providing a driving mode generating unit for transmitting a mode signal for the adjustable factor;
    applying the adjustable factor in the variable steering ratio; and
    determining the adjustable factor by applying a mode signal from the driving mode generating unit.

12. The method of claim 11 wherein the adjustable factor proportionally affects a change in the membership functions of the steering wheel angle.

13. The method of claim 11 wherein the adjustable factor proportionally affects a change in the membership functions of the vehicle speed.

14. The method of claim 11 wherein the adjustable factor includes a plurality of adjustable factors.

15. The method of claim 11 wherein the mode generating unit applies fuzzy logic technology to generate the mode signal wherein the mode signal is indicative of a driving mode based on a driving style and an environmental situation.

16. The method of claim 15 wherein the adjustable variable ratio is automatically set wherein the mode signal varies with the driving style and the environmental situation.

17. The method of claim 11 wherein the adjustable variable steering ratio is manually set by an occupant of the vehicle, wherein the variable mode signal is switched to a fixed constant unit such that the adjustable factor is constant in value.

18. The method of claim 1 wherein the steering angle membership function includes a plurality of memberships with linguistic term labels.

19. The method of claim 1 wherein the steering angle includes steering angles ranging between about −500° and +500°.

20. The method of claim 19 wherein the steering angle includes angles ranging from less than −400° to −300°, −400° to −200°, −300° to −100°, −200° to 0, −100° to +100°, 0 to 200°, 100° to 300°, and 200° to greater than 400°.

21. The method of claim 1 wherein the step of converting the actual steering wheel angle includes determining a degree of membership within at least two memberships expressed by relative labels.

22. The method of claim 21 wherein the degree of membership for the steering wheel angle indicates a value between 0 and 1 within a corresponding, steering wheel angle membership with relative label.

23. The method of claim 1 wherein converting the road wheel angle in the fuzzy set to a crisp road wheel angle of the vehicle includes a mean of maximum method, a maximum decision method, and a centroidal defuzzification method.

24. A method of providing a variable steering ratio of a steer-by-wire system using fuzzy logic technology for a vehicle, the method comprising:

sensing an actual steering wheel angle and an actual vehicle speed of the vehicle;
    converting the actual steering wheel angle to a steering angle within values-in the fuzzy sets of the actual steering wheel angle based on a steering angle membership function with linguistic term labels;
    converting the actual vehicle speed into values in the fuzzy sets of the actual vehicle speed based on a vehicle speed membership function with linguistic term labels;
    determining a corresponding degree of membership of the actual steering wheel angle;

determining a corresponding degree of membership of the actual vehicle speed;

inferring a fuzzy road wheel reference angle output value by determining a degree of membership for the fuzzy road wheel reference angle using fuzzy rules based on the degrees of memberships of the actual steering wheel angle and vehicle speed; and converting the road wheel angle in the fuzzy sets to a crisp road wheel reference angle of the vehicle.

25. The method of claim 24 wherein the steering angle membership function includes a plurality of steering angle labels.

26. The method of claim 24 wherein the steering angle membership function includes steering angles ranging between about −500° and +500°.

27. The method of claim 24 wherein the plurality of steering angle includes angles ranging from less than −400° to −300°, −400° to −200°, −300° to −100°, −200° to 0, −100° to +100°, 0 to 200°, 100° to 300°, and 200° to greater than 400°.

28. The method of claim 24 wherein the step of converting the actual steering wheel angle includes determining a degree of membership within at least two memberships expressed by relative labels.

29. The method of claim 28 wherein the degree of membership for the steering wheel angle indicates a value between 0 and 1 within a corresponding steering angle membership function with relative label.

30. The method of claim 24 wherein the vehicle speed membership function includes a plurality of membership with linguistic term labels.

31. The method of claim 30 wherein the vehicle speed include speeds ranging from 0 to 60 mph, and 20 to 120 mph.

32. The method of claim 24 wherein the vehicle speed includes speeds ranging between about 0 to 120 mph.

33. The method of claim 24 wherein the step of converting the actual vehicle speed includes determining a degree of membership within at least two memberships expressed by relative labels.

34. The method of claim 33 wherein the degree of membership within the vehicle speed indicates a value between 0 and 1 within a corresponding vehicle speed membership function with relative label.

35. The method of claim 24 wherein the step of inferring the road wheel angle includes determined the degree of membership function for the road wheel angle within at least two memberships expressed by relative labels using predetermined fuzzy rules based on the degrees of steering angle and the vehicle speed.

36. The method of claim 24 wherein the steering ratio of the vehicle is an adjustable variable steering ratio of the steer-by-wire system for a vehicle using fuzzy logic technology.

37. The method of claim 36 further comprising:

providing an adjustable factor being configured to vary between a range of about 0 and 1 and providing a driving mode generating unit for transmitting a mode signal for the adjustable factor;

applying the adjustable factor in the variable steering ratio; and determining the adjustable factor by applying a mode signal from the driving mode generating unit.

38. A system for controlling a variable steering ratio of a vehicle steer-by-wire system, the system comprising:

a sensor for sensing an actual steering wheel angle of the vehicle;

a sensor for sensing an actual speed of the vehicle;

a steering wheel control system for providing steering feel for a vehicle and a steering wheel angle command signal;

a road wheel control system for controlling road wheels of the vehicle and tracking the road wheel reference angle signal;

a fuzzy logic unit linking the steering wheel control system and the road wheel control system, the fuzzy logic unit implementing a fuzzy logic strategy including a fuzzification block, an inference block, and a defuzzification block, the fuzzication block being implemented for converting the actual steering wheel angle in a fuzzy set based on a steering angle membership function and for determining a corresponding degree of membership of the steering wheel angle, the fuzzification block being implemented for converting the actual vehicle speed in the fuzzy set based on a vehicle speed membership function and determining the corresponding degree of membership of the vehicle speed, the inference block being implemented for inferring the road wheel reference angle by determining the degree of membership function for the road wheel reference angle using fuzzy rules based on the degrees of steering angle and the vehicle speed the defuzzification block being implemented for converting the road wheel angle in the fuzzy set to a crisp road wheel angle of the vehicle.

39. The system of claim 38 wherein the variable steering ratio of the vehicle steer-by-wire system is based on a fuzzy logic variable steering ratio system.

40. The system of claim 39 further comprising:

an adjustable factor unit having an adjustable factor being configured to vary in the range of 0–1;

a mode generating unit configured to transmit a mode signal indicative of a driving mode;

an adjustable variable steering ratio regulation unit including a variable steering ratio configured for a plurality of driving types and environmental situations, wherein the adjustable variable steering ratio regulation unit includes an adjustable factor unit having an adjustable factor, the adjustable factor being configured to adjust based on a driving mode, the adjustable factor unit receiving a mode signal from the mode generating unit for adjusting the adjustable factor to proportionally effect a change in the membership functions of steer-by-wire system and vehicle variables, the mode signal being indicative of a driving mode based the driving style and the environmental situation, the adjustable variable ratio being set by an occupant of the vehicle or being set automatically.

41. The system of claim 40 wherein the steer-by-wire system and vehicle variables include steering wheel angle and vehicle speed.

* * * * *